(12) United States Patent
Murata et al.

(10) Patent No.: US 7,720,504 B2
(45) Date of Patent: May 18, 2010

(54) RADIO COMMUNICATION APPARATUS OR MOBILE STATION

(75) Inventors: Syuuichi Murata, Yokohama (JP); Atsushi Tanaka, Yokohama (JP); Junichi Niimi, Kunitachi (JP); Takahiro Matusaki, Miura (JP); Akihide Otonari, Kasuya (JP); Yuka Araikawa, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 430 days.

(21) Appl. No.: 11/107,733

(22) Filed: Apr. 18, 2005

(65) Prior Publication Data

US 2006/0111100 A1 May 25, 2006

(30) Foreign Application Priority Data

Nov. 25, 2004 (JP) ............................. 2004-340556

(51) Int. Cl.
*H04M 1/00* (2006.01)
(52) U.S. Cl. ................. 455/550.1; 455/403; 455/67.11; 370/328
(58) Field of Classification Search ............. 455/550.1, 455/561, 423, 69, 522, 67.1, 67.11, 41.2, 455/403; 370/328, 338, 335, 311, 350; 375/316, 375/130, 142; 713/300
See application file for complete search history.

(56) References Cited

U.S. PATENT DOCUMENTS

| 6,327,255 | B1 * | 12/2001 | Kage ........................... 370/335 |
| 6,832,095 | B2 * | 12/2004 | Haim .......................... 455/522 |
| 6,891,908 | B2 * | 5/2005 | Matsu Moto et al. ......... 375/344 |
| 7,215,929 | B2 * | 5/2007 | Rikola et al. ............... 455/67.11 |
| 2001/0024427 | A1 | 9/2001 | Suzuki |
| 2003/0036361 | A1 * | 2/2003 | Kawai et al. ................... 455/69 |
| 2004/0087329 | A1 * | 5/2004 | Shinoi ......................... 455/522 |
| 2004/0110473 | A1 * | 6/2004 | Rudolf et al. .................. 455/69 |
| 2004/0266358 | A1 * | 12/2004 | Pietraski et al. ........... 455/67.11 |
| 2005/0031019 | A1 * | 2/2005 | Itoh ............................ 375/142 |

(Continued)

FOREIGN PATENT DOCUMENTS

JP 2001-238269 8/2001

(Continued)

OTHER PUBLICATIONS

3GPP TS 25.212 v6.2.0 (Jun. 2004); $3^{rd}$ Generation Partnership Project; Technical Specification Group Radio Access Network; Multiplexing and Channel Coding (FDD) (Release 6).

(Continued)

*Primary Examiner*—Danh C Le
(74) *Attorney, Agent, or Firm*—Hanify & King, P.C.

(57) ABSTRACT

To provide a radio communication apparatus and a mobile station sensitive to change in the radio environment. A mobile station corresponding to the HSDPA and transmitting the CQI information used for the adaptive modulation control executed by a radio base station, comprising a radio environment supervising unit for supervising change in the radio environment on the basis of the received signal from the radio base station, a CQI generating unit for generating the CQI information reflecting change in the reception quality from the radio base station in accordance with the result of supervising by the supervising unit, and a transmitting unit for transmitting the generated CQI information to the radio base station.

3 Claims, 5 Drawing Sheets

| CQI | TBS | NUMBER OF CODES | MODULATION SCHEME | CPICH-SIR(dB) |
|---|---|---|---|---|
| 1 | 137 | 1 | QPSK | 0.5 |
| 2 | 173 | 1 | QPSK | 1.5 |
| 3 | 233 | 1 | QPSK | 2.5 |
| ... | ... | ... | ... | ... |
| 14 | 2583 | 4 | QPSK | 13.5 |
| 15 | 3319 | 4 | QPSK | 14.5 |
| 16 | 3565 | 5 | 16-QAM | 15.5 |
| 17 | 4189 | 5 | 16-QAM | 16.5 |
| ... | ... | ... | ... | ... |
| 29 | 24222 | 15 | 16-QAM | 28.5 |
| 30 | 25558 | 15 | 16-QAM | 29.5 |

U.S. PATENT DOCUMENTS

2005/0169410 A1* 8/2005 Tanaka .................. 375/346
2006/0056501 A1 3/2006 Shinoi et al.
2006/0129567 A1* 6/2006 Uchida .................. 707/100

FOREIGN PATENT DOCUMENTS

| JP | 2001-268148 | 9/2001 |
|---|---|---|
| JP | 2004-186969 | 7/2004 |
| JP | 2004-215104 | 7/2004 |
| WO | WO2004/066547 | 8/2004 |

OTHER PUBLICATIONS

3GPP TS 25.214 v6.2.0 (Jun. 2004); $3^{rd}$ Generation Partnership Project; Technical Specification Group Radio Access Network; Physical Layer Procedures (FDD) (Release 6).

$3^{rd}$ Generation Partnership Project; Technical Specification Group Radio Access Network; HSDPA Enhancements; (Release 6), 3GPP TR 25.899 V..0.5.0, 3GPP (May 2004).

* cited by examiner

| CQI | TBS | NUMBER OF CODES | MODULATION SCHEME | CPICH-SIR(dB) |
|---|---|---|---|---|
| 1 | 137 | 1 | QPSK | 0.5 |
| 2 | 173 | 1 | QPSK | 1.5 |
| 3 | 233 | 1 | QPSK | 2.5 |
| ... | ... | ... | ... | ... |
| 14 | 2583 | 4 | QPSK | 13.5 |
| 15 | 3319 | 4 | QPSK | 14.5 |
| 16 | 3565 | 5 | 16-QAM | 15.5 |
| 17 | 4189 | 5 | 16-QAM | 16.5 |
| ... | ... | ... | ... | ... |
| 29 | 24222 | 15 | 16-QAM | 28.5 |
| 30 | 25558 | 15 | 16-QAM | 29.5 |

Fig.2

RADIO COMMUNICATION APPARATUS OR MOBILE STATION

CROSS REFERENCE TO RELATED APPLICATION

This application is related to and claims priority to Japanese Application No. 2004-340556 filed Nov. 25, 2004 in the Japanese Patent Office, the contents of which are incorporated by reference herein.

BACKGROUND OF THE INVENTION

1. Field of the Invention

The present invention relates to a radio communication apparatus or a mobile station that may be used, for example, in a mobile communication system introducing the W-CDMA (UMTS) communication system.

2. Description of the Related Art

At present, the standardization of the W-CDMA (UMTS) system, one of the third generation mobile communication system, is continued by the 3GPP ($3^{rd}$ Generation Partnership Project). One of the aspects of the standardization is the specification of HSDPA (High Speed Downlink Packet Access) to realize the maximum transmission rate of about 14 Mbps in the downlink.

The HSDPA employs the Adaptive Modulation and Coding (AMC), which, for example, may be characterized by adequately switching the QPSK modulation scheme and the 16 QAM scheme in accordance with the radio environment between the base station and mobile station.

Moreover, for the HSDPA, the H-ARQ (Hybrid Automatic Repeat request) is employed. In the H-ARQ when an error is detected in the received data from a base station, a mobile station sends a re-transmission request to the base station. The base station having received this re-transmission request retransmits the data. Accordingly, the mobile station executes the error correction decoding using both the data already received and the retransmitted received data. If an error is detected in the H-ARQ, the number of times of retransmission is reduced by effectively using the data already received in the H-ARQ system.

The radio channels used for the HSDPA include the HS-SCCH (High Speed-Shared Control Channel), HS-PDSCH (High Speed-Physical Downlink Shared Channel) and HS-DPCCH (High Speed-Dedicated Physical Control Channel).

Both HS-SCCH and HS-PDSCH are shared channels of the downlink (namely, in the direction to a mobile station from a base station) and the HS-SCCH is the control channel for transmitting various parameters of the data transmitted with the HS-PDSCH. Various parameters may include modulation type (scheme) information indicating the modulation scheme to be used, the number of spreading codes (number of codes) to be assigned, and the information of the pattern of rate matching process to be executed before transmission.

Meanwhile, the HS-DPCCH is the individual control channel of the uplink (namely, direction to a base station from a mobile station). For example, this control channel is used by the mobile station to transmit, to the base station, the acknowledgment or no-acknowledgement of reception of the data received from the base station via the HS-PDSCH as the ACK signal or NACK signal. When the mobile station fails reception of data (when a CRC error is detected in the received data or the like), since the mobile station transmits the NACK signal as the retransmission request, the base station executes the retransmission control. If neither the ACK signal nor the NACK signal is received (in the case of DTX), the radio base station executes also the retransmission control. Accordingly, the DTX condition which occurs when the mobile station transmits neither the ACK signal nor the NACK signal may be considered as one of the retransmission request.

Moreover, the HS-DPCCH is also used to transmit the reception quality information of the received signal from the base station measured by the mobile station (for example, SIR) to the base station as the CQI (Channel Quality Indicator) information. The base station changes the transmission format of the downlink with the CQI information received. Namely, when the CQI information indicates that the radio environment in the downlink is good, the transmission format is switched to the modulation scheme which enables data transmission in the higher rate. When the inverse CQI information indicates that the radio environment in the downlink is bad, the transmission format is switched to the modulation scheme enabling data transmission in the lower transmission rate (namely, adaptive modulation).

[Channel Format]

Next, a channel format of the HSDPA will be described.

FIG. 1 illustrates a channel format of the HSDPA. Since the W-CDMA employs a code division multiplex method, each channel is demultiplexed by the code.

First, the channels not described above will be explained. The CPICH (Common Pilot Channel) and the P-CCPCH (Primary Common Control Physical Channel) are respectively the common channels of the downlink.

The CPICH is the channel used in the mobile station for channel estimation, cell search and as the standard timing of the physical channel of the downlink in the same cell. This channel is so-called used for transmission of the pilot signal. The P-CCPCH is the channel provided for each cell and used to transmit the broadcast information.

Next, the timings of channels will be explained with reference to FIG. 1.

As illustrated in FIG. 1, each channel forms one frame (10 ms) with 15 slots (each slot corresponds to the length of 2560 chips). As described above, since the CPICH is used as the reference channel of the other channels, the leading frames of the P-CCPCH and HS-SCCH frames are matched with the leading frame of the CPICH frames. Here, the leading frame of the HS-PDSCH frames is delayed by 2 slots for the HS-SCCH or the like. Accordingly, the mobile station is capable of demodulating the HS-PDSCH with the demodulation scheme corresponding to the received modulation scheme after reception of the modulation scheme information via the HS-SCCH. Moreover, the HS-SCCH and HS-PDSCH form one subframe with three slots.

The HS-DPCCH is the uplink channel and the first slot thereof is used to transmit the ACK/NACK signal as the response signal for verifying reception to a base station from a mobile station after passage of about 7.5 slots from reception of the HS-PDSCH. Moreover, the second and third slots are used for periodical feedback transmission of the CQI information for the adaptive modulation control to the base station. Here, the CQI information to be transmitted is calculated on the basis of the receiving environment (for example, result of SIR measurement of CPICH) measured during the period up to before one slot from before four slots of the CQI transmission.

FIG. 2 illustrates a CQI table for using the SIR (Signal to Interference Ratio) of the CPICH.

As illustrated in the figure, the table defines, for respective CQI information pieces 1 to 30, the correspondence relationship among the number of TBS (Transport Block Size) bits, number of codes, modulation scheme, and CPICH-SIR.

Here, the number of TBS bits indicates the number of bits to be transmitted in one subframe, the number of codes indicates the number of spreading codes used for transmission of the HS-PDSCH, the modulation scheme indicates any of QPSK and QAM used.

As is apparent from the figure, the better the SIR of CPICH is (SIR is larger), the larger the CQI becomes. When the CQI is larger, the number of corresponding TBS bits and the spreading codes becomes larger and the modulation scheme is switched to the QAM modulation. Accordingly, when the SIR is better, the transmission rate is faster, and the more radio resources (spreading code or the like) are used.

For example, the table illustrated in the figure may be stored in the memory of the mobile station. As explained previously, the mobile station periodically measures the SIR of the CPICH in the receiving environment measuring period and transmits CQI corresponding to the SIR measured with reference to the stored table to the base station by identifying the same CQI.

The base station achieves the transmission control considering the receiving environment of the CPICH in the mobile station by executing the adaptive modulation control described previously in accordance with the CQI information received. The channel format of the HSDPA has been briefly explained above.

Contents of the HSDPA described above is disclosed in the 3G TS 25. 212 ($3^{rd}$ Generation Partnership Project: Technical Specification Group Radio Access Network; Multiplexing and channel coding (FDD) V6. 2.0 (June 2004).

According to the related art described previously, a mobile station can smoothly realize transmission control with respect to the radio environment between the mobile station and a base station by periodically measuring the reception quality of the downlink signal and by periodically transmitting the parameter information (CQI information) used for the adaptive modulation control to the radio base station.

However, when the transmission period (cycle) of the CQI information is longer and when the same CQI information is repeatedly transmitted several times corresponding to a single trial of measurement, mismatching may easily be generated between the radio environment between the base station and mobile station to actually conduct the adaptive modulation control and the CQI information used for the adaptive modulation control.

SUMMARY OF THE INVENTION

Therefore, one of the object of the present invention is to provide a radio communication apparatus—a mobile station that adapts to changes in the radio environment.

Moreover, it is desirable to set the CQI table described above to select a certain transmission format to satisfy the constant reference error rate when the reception quality of the signal transmitted from the base station takes various values (0.5 dB, . . . ).

However, in the actual radio environment, the reference error rate is not satisfied when the CQI value corresponding to the reception quality is obtained by making reference to the CQI table.

For example, when the reception quality measured by the mobile station is expressed by SIR=2.5 dB, CQI=3 is transmitted to the radio base station. The radio base station uses the data of bits (233 bits) corresponding to CQI=3 as the transport block, the corresponding number of codes (1) as the number of spreading codes used for transmission, and also uses the corresponding modulation scheme as the modulation method (QPSK).

However, actually, the radio environment enables higher transmission and therefore the mobile station receives the data in the quality which is excessively lower than the reference error rate. As a result, excessive quality condition may be generated.

Of course, it is also likely to occur that the data is received in the insufficient quality condition which is just in the contrary to the excessive quality condition.

Therefore, another object of the present invention is to control the excessive quality condition or insufficient quality condition.

In one embodiment of the invention, with a radio communication apparatus transmitting a parameter used for adaptive modulation control in a transmitting apparatus conducting the adaptive modulation control, the radio communication apparatus comprises a radio environment supervising unit for supervising change in the radio environment on the basis of the received signal from the transmitting apparatus, a storage unit for storing correspondence relationship between reception quality of the received signal from the transmitting apparatus and the parameter used for the adaptive modulation control, a parameter generating unit for selecting, upon detection that the radio environment is changed to the better direction with the radio environment supervising unit, the parameter corresponding to the higher transmission format than that corresponding to the measured reception quality, and a transmitting unit for transmitting the selected parameter.

In another embodiment of the invention, a radio communication apparatus transmitting parameter used for the adaptive modulation control in a transmitting apparatus conducting the adaptive modulation control, the radio communication apparatus comprises a radio environment supervising unit for supervising change of radio environment on the basis of the received signal from the transmitting apparatus, a storage unit for storing correspondence relationship between the reception quality of the received signal from the transmitting apparatus and parameter used for the adaptive modulation control, a parameter generating unit for selecting, upon detection that the radio environment is changed to the not better direction by the radio environment supervising unit, the parameter corresponding to the lower transmission format than that corresponding to the measured reception quality, and a transmitting unit for transmitting the selected parameter.

In a third embodiment of the invention, a mobile station that is conformable to HSDPA and that transmits CQI information used for adaptive modulation control of a radio base station, comprises a radio environment supervising unit for supervising change of radio environment on the basis of the received signal from the radio base station, a CQI generating unit for generating the CQI information reflecting direction of change in the reception quality from the radio base station in accordance with the result of supervising by the supervising unit, and a transmitting unit for transmitting the generated CQI information to the radio base station.

In a fourth embodiment of the invention, a radio communication apparatus transmitting parameter used for an adaptive modulation in a transmitting apparatus executing the adaptive modulation control, comprises a parameter generating unit for generating the parameter used for the adaptive modulation control on the basis of the relationship between a reference error rate and a measured error rate for data transmitted through the adaptive modulation control, and a transmitting unit for transmitting the generated parameter.

The radio communication apparatus further comprises a storage unit for storing correspondence relationship between reception quality of the received signal from the transmitting apparatus and parameter used for the adaptive modulation control, wherein the parameter generating unit generates the parameter corresponding to the measured reception quality through compensation thereof with the relationship as a result of comparison between the measured error rate and the reference error rate.

In a fifth embodiment of the invention, a mobile station which is conformable to HSDPA and transmits CQI information used for adaptive modulation control executed by the radio base station, the mobile station comprises a CQI generating unit for compensating for the CQI information corresponding to the reception quality of CPICH in accordance with the relationship as a result of comparison between a error rate of data received via HS-PDSCH and a reference error rate, and a transmitting unit for transmitting the CQI information after the compensation.

BRIEF DESCRIPTION OF THE DRAWINGS

FIG. 2 shows an example of a CQI table.

DETAILED DESCRIPTION OF THE PREFERRED EMBODIMENTS

The preferred embodiments of the present invention will be described with reference to the accompanying drawings.

[a] Description of First Embodiment

[Structure of Radio Communication Apparatus]

Figure 3:
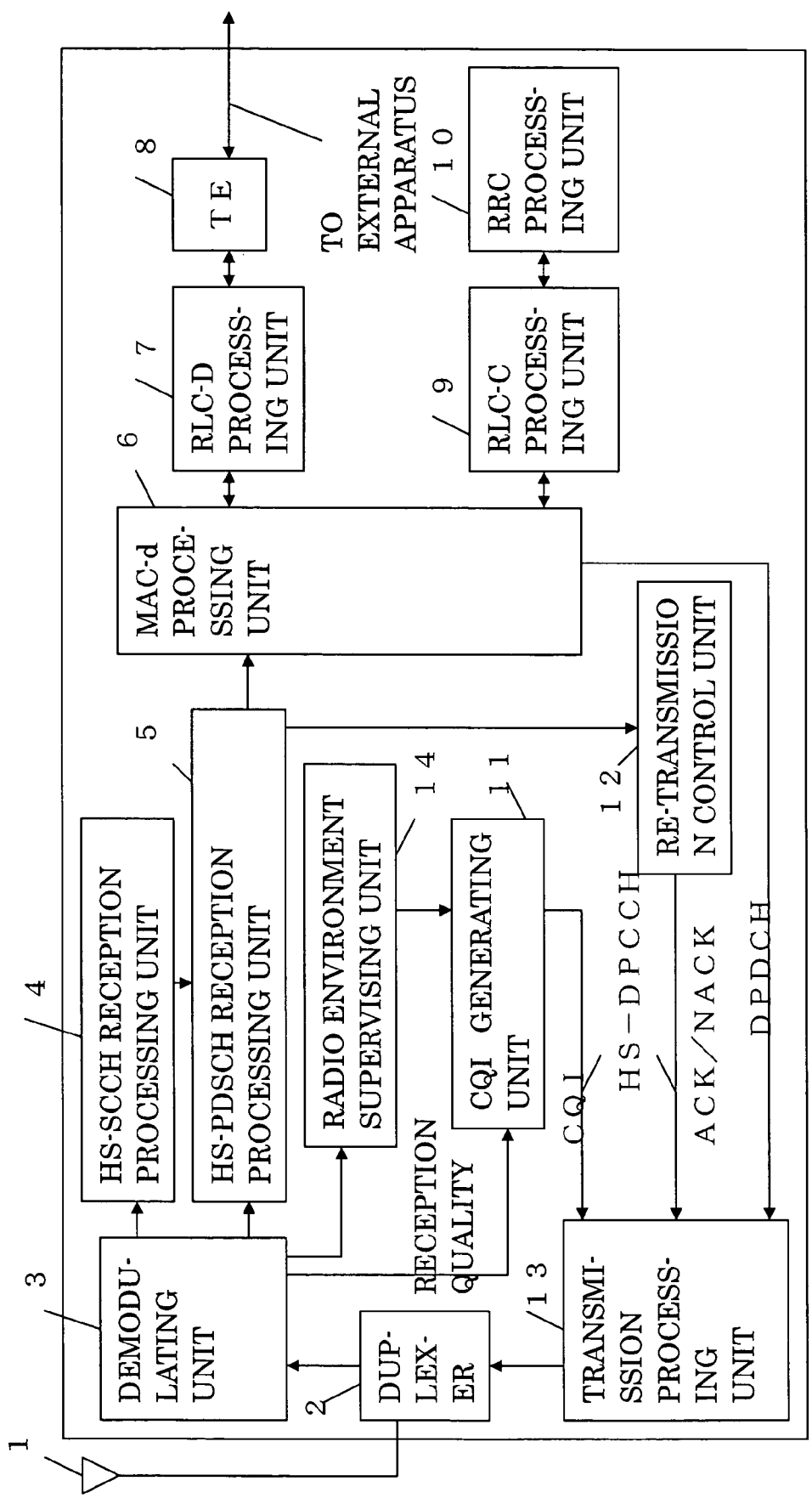
FIG. 3 shows a radio communication apparatus (mobile station) of the present invention.

FIG. 3 is a diagram illustrating a communication apparatus of the present invention. As an example of the radio communication apparatus, a mobile station is considered, which is used in a mobile communication system corresponding to the WCDMA (UMTS) employing the HSDPA channel. This communication apparatus can of course be adapted to a radio communication apparatus used in the other mobile communication system.

In FIG. 3, numeral 1 denotes an antenna; 2, a duplexer; 3, a demodulating unit; 4, an HS-SCCH reception processing unit; 5, an HS-PDSCH reception processing unit; 6, a MAC-d processing unit; 7, an RLC-D processing unit; 8, a TE (Terminal Equipment); 9, an RLC-C processing unit; 10, an RRC processing unit; 11, a CQI generating unit; 12, a retransmission control unit; 13, a transmission processing unit; 14, a radio environment supervising unit.

The mobile station receives the downlink signal (for example, CPICH, P-CCPCH, HS-SCCH, HS-PDSCH or the like) with antenna 1 and applies the signal to the demodulating unit 3 via the duplexer 2.

The demodulating unit 3 implements the receiving process such as the orthogonal detection or the like to the received signal and then applies the demodulated signal to the HS-SCCH reception processing unit 4, HS-PDSCH reception processing unit 5. Moreover, the demodulating unit 3 measures reception quality (for example, SIR) of the received signal (for example, CPICH) from the radio base station and then applies the result of measurement to the CQI generating unit 11 and the radio environment supervising unit 14.

The receiving environment can be periodically measured within the period before one slot from before four slots for the slots for transmitting the CQI information and the result of measurement can be transmitted for each measurement. Various measuring periods are possible, and it is also possible that if measurement is carried out within 20 ms, the same result of the measurement is transmitted repeatedly in the first to fourth subframes, the remaining six subframes are not transmitted, and the measurement is carried out again in the next radio frame, with the result being transmitted in the same manner in the predetermined subframes.

The minimum measuring period which is required for transmission of the CQI value to the radio base station as described above is called here the reference measuring period.

From the viewpoint of not increasing the measurement frequency, measurement for applying the signal to the CQI generating unit 11 and radio environment supervising unit 14 can be carried out in the common reference measuring period.

However, when it is requested to detect more accurately changes, with the radio environment supervising unit 14, in the radio environment (changes in the reception quality), it is desirable to execute measurement of the reception quality (receiving SIR) in the timing not within the measuring period by the reference measuring period also.

Figure 1:
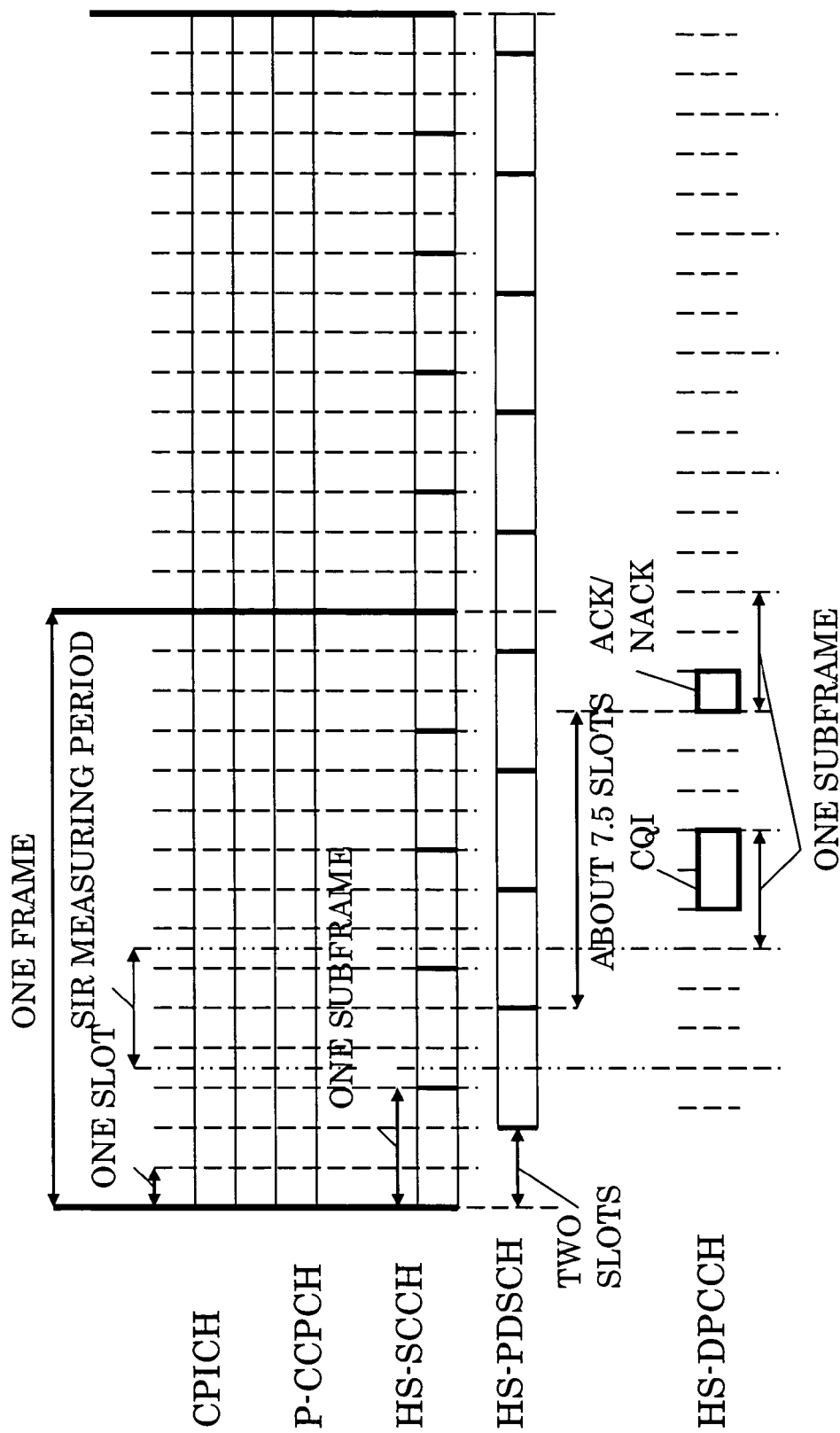
FIG. 1 shows a channel format of the HSDPA.

The HS-SCCH reception processing unit 4 is the reception processing unit for receiving the signal to be transmitted via the HS-SCCH shown in FIG. 1. This unit 4 receives, demodulates, and decodes a first slot of the HS-SCCH in order to judge whether there exist the message to the own station or not.

The first slot is used to transmit the signal obtained by the convolutional coding of the Xccs (Channelization Code Set information), Xms (Modulation Scheme information) and by multiplication of Xue (User Equipment identity) thereto. Using the Xue of the owner station, the mobile station can judge whether the message is destined for the owner station or not by implementing inverse arithmetic process and decoding process. When the message is judged to be destined for the owner station, the remaining two slots of the HS-SCCH are received and the HS-PDSCH to be transmitted with delay of two slots is received.

Here, for the reception of the HS-PDSCH, the despreading code designated by Xccs is set and demodulation is conducted with the demodulation scheme corresponding to the modulation scheme designated by Xms. After two slots of the HS-SCCH, Xtbs (Transport Block Size information), Xhap (Hybrid ARQ Process information), Xrv (Redundancy and constellation Version), Xnd (New Data indicator) are included. Meaning and roles of these information pieces are well known and therefore the description thereof is omitted.

When the message destined for the owner station is detected by the HS-SCCH reception processing unit 4, the HS-PDSCH reception processing unit 5 executes the reception process and outputs the result of demodulation and decoding to the MAC-d processing unit 6.

Moreover, detection result of error for the decoding result (for example, presence or not-presence of the CRC error) is applied to the retransmission control unit 12 (and the radio environment supervising unit 14 and error rate calculating unit 15).

[Detail Structure of HS-PDSCH Reception Processing Unit]

Here, detail structure of the HS-PDSCH reception processing unit 5 will be described with reference to FIG. 4.

Figure 4:
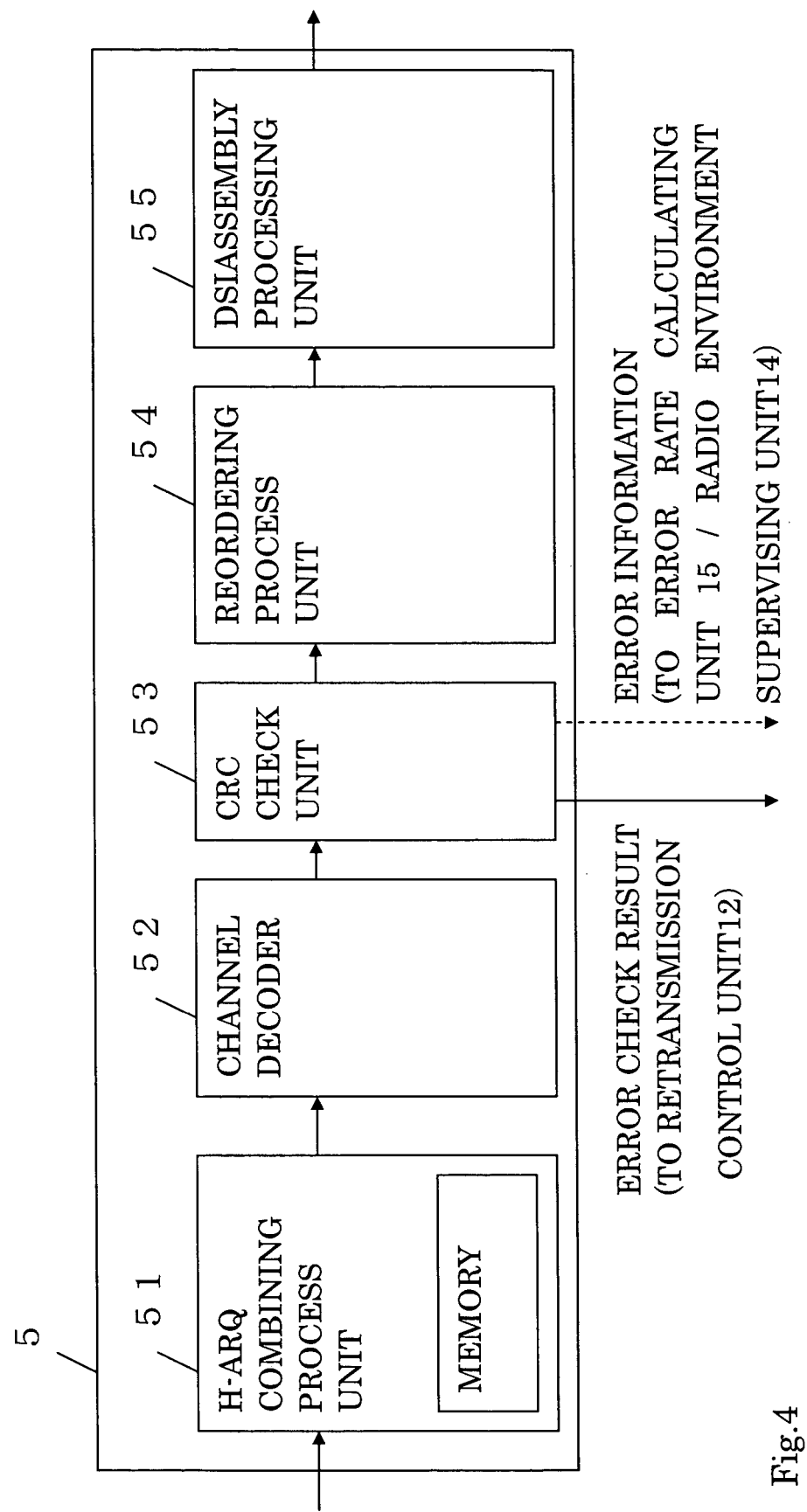
FIG. 4 shows a detail structure of an HS-PDSCH reception processing unit of the present invention.
Figure 5:
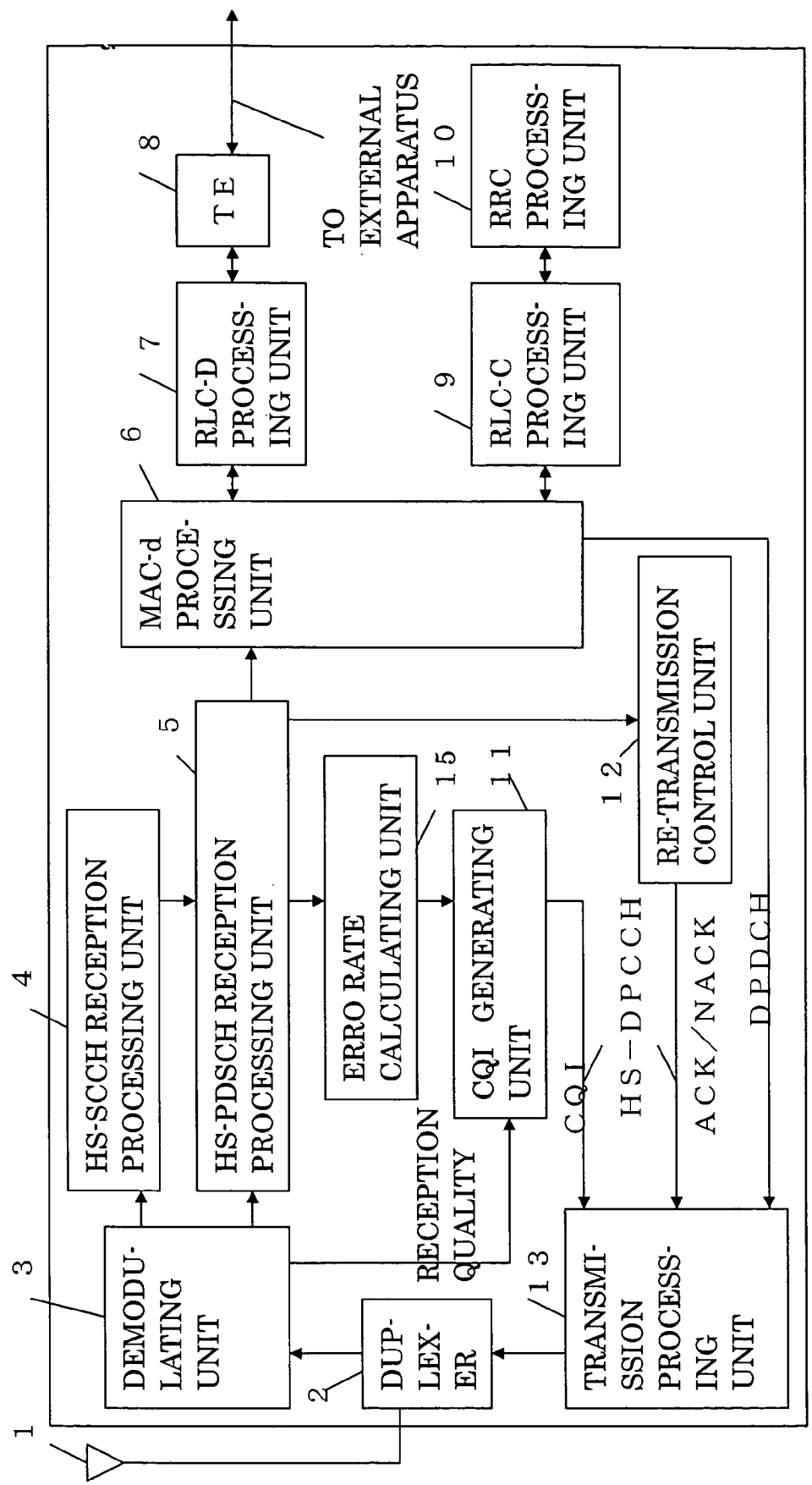
FIG. 5 shows the radio communication apparatus (mobile station) of the present invention.

FIG. 4 is a diagram showing a detail structure of the HS-PDSCH reception processing unit (MAC-hs processing unit) 5. However, the de-rate matching processing and de-interleave process corresponding to the rate matching process and interleave process to be conducted in the transmitting side are not illustrated but the processes for inserting the data of the likeliness 0 into the bit portion erased by the rate matching and for resetting the sequence of the rearranged data to the original one are executed at the required portions.

Numeral 51 denotes an H-ARQ combining unit; 52, a channel decoder; 53, a CRC check unit; 54, a re-ordering process unit; 55, a disassembly processing unit.

The data received via the HS-PDSCH and demodulated by the demodulating unit 3 is then applied to the H-ARQ combining process unit 51. The H-ARQ combining process unit 51 is provided to conduct the H-ARQ combining process and transfers, without the combining with the received data stored in the memory, in direct the received data to the channel decoder 52 when the mobile station has judged the new transmission.

Meanwhile, when the mobile station has judged the retransmission the received data is transferred, after combining with the received data stored in the memory, to the channel decoder 52. Here, as an example of the combining process, an averaging of the likeliness information included in the demodulated data and supplement of the shortage bits may be considered.

The new transmission and retransmission can be identified by judgment on the basis of the Xnd (New Data indicator) transmitted via the HS-SCCH or the like. For example, when Xnd changes to 0 from 1, switching to the new transmission is detected from 0 through the change and when Xnd remains at 1, retransmission can be detected because of no-change.

The received data in the new transmission or the combined data after the combining process in the retransmission is applied to the channel decoder 52. Here, an error correction decoding process such as the turbo decoding process or the like is executed for these input data.

Accordingly, even when an error is included in the received data and combined data, the data which has been controlled the error through error correction is outputted from the channel decoder 52.

The data after the decoding process is subjected to the error detection process by the CRC check unit 53 and the error presence or no-presence information is applied to the retransmission control unit 12 (radio environment supervising unit 14 and error rate calculating process 15).

When an error occurs, the NACK signal is transmitted to the radio base station from the transmission processing unit 13. When an error does not occur, the ACK signal is transmitted. The base station executes the retransmission control when the NACK signal is received or neither the NACK signal nor the ACK signal is received.

The data is analyzed by the CRC check unit 5 to ensure that it is error-free, and then it is applied to the reordering process unit 54.

The reordering process unit 54 performs the reordering process on the basis of the sequence information (for example, TSN) included in the data (MAC-hs PDU) which has been detected not to include any error and applies the rearranged data to the disassembly processing unit 55.

The disassembly processing unit 55 performs the header erasing process or the like and applies MAC PDU (RLC PDU) to the MAC-d processing unit 6.

The reordering process unit 54 drives a T1 timer upon detection of generation of missing of sequence in the rearrangement process. When the missing of sequence cannot be solved until the predetermined time has passed, the reordering process unit 54 transfers the data train including the missing of sequence to the MAC-d processing unit 6 via the disassembly processing unit 55 entrusting the retransmission control in the RLC layer as the upper layer.

Returning to the description based on FIG. 3, the MAC-d processing unit 6 executes the process to cancel secrecy of the data from the HS-PDSCH reception processing unit 5 to apply the data of the user data to the RLC-D processing unit 7 and the data of the control signal after canceling secrecy to the RLC-C processing unit 9.

The RLC-D processing unit 9 performs the reordering process using the sequence number included in the MAC PDU (RLC PDU) to detect missing of sequence and check the polling bits.

Here, when missing of sequence is detected, the RLC-D processing unit 7 controls, in cooperation with the RLC-C processing unit 9, the transmission processing unit 13 to transmit the NACK signal for retransmission control in the RLC layer to the radio base station via the individual physical channel (DPCH) which is established additionally.

Moreover, the RLC-C processing unit 9 checks, when it is detected that the polling bit is detected to be set to request reporting of the PDU condition (for example, the condition to indicate generation of missing of the sequence or the like), the condition indicating generation of the missing in sequence of the sequence number via the individual physical channel (DPCH) already established additionally and controls the transmission processing unit 13 to transmit, via the DPCH, the ACK signal when the missing of sequence is not generated and the NACK signal when the missing of sequence is generated.

In addition, the RLC-C processing unit 9 applies the control data required among the control data received from the radio base station to the RRC processing unit 10 to execute the radio resource control.

Here, the data having completed the reordering process in the RLC-D processing unit 7 is then outputted from an output unit (display unit, voice output unit or the like) not illustrated of the mobile station, transferred to the TE (terminal equipment) 8, or transmitted (transferred) to an external apparatus in order to output to an external apparatus side.

[CQI Generating Process of CQI Generating]

As described above, the CQI generating unit 11 receives, as the inputs from the demodulating unit 3, the reception quality information of the received signal from the radio base station (for example, receiving SIR of the CPICH) and the result of supervising the radio environment conducted in the radio environment supervising unit 14.

The radio environment supervising unit 14 detects, on the basis of the reception quality obtained from the demodulating unit 3, direction of change in the reception quality (radio environment). Such reception quality may also obtained in the reference period or in the period outside of the reference period.

For example, when the receiving SIR of the CPICH is inputted as the reception quality, whether the receiving SIR has increased or decreased is judged using the receiving SIR before or after such input and the result of the judgment is applied to the CQI generating unit 11.

Moreover, the receiving SIR is assigned any of the statuses extreme increase, fine increase, extreme reduction and fine reduction in accordance with a degree of change in SIR per unit time and the corresponding status may also be applied to the CQI generating unit 11 as the information in regard to the direction of change in the radio environment.

Here, the CQI generating unit 11 stores the CQI table in the memory (storage unit) not illustrated, namely the information storing the correspondence between the reception quality of the CPICH and the CQI information as the parameter used for the adaptive modulation control.

Accordingly, when the receiving SIR measured for the CPICH is inputted from the demodulating unit 3, the CQI value corresponding to the receiving SIR inputted is read by referring to the CQI table for catching with the report timing to the radio base station of the CQI information.

The CQI information read out is compensated in accordance with the information of the direction of change in the radio environment inputted additionally.

For example, when direction of change in the radio environment is good (the receiving SIR increases), the CQI value is compensated to the value corresponding to selection of the high speed transmission format with the adaptive modulation control (the CQI value is compensated to a large extent).

When the direction of change in the radio environment is not good (the receiving SIR decreases), the CQI value is compensated to the value in the side for selecting the low speed transmission format with the adaptive modulation control (the CQI value is compensated to a small value).

In any case, the CQI information reflecting the direction of change (the status) in the reception quality from the radio base station is generated by the CQI generating unit 11 and the CQI value generated by the CQI generating unit 11 is transmitted to the radio base station from the transmission processing unit 13 via the HS-DPCCH.

In the case where the CQI value is transmitted to the radio base station for several times within the period for measuring the CQI value, it is possible to sequentially compensate the CQI value to a large or a smaller value for the transmission of a plurality of times. When the CQI value is sequentially compensated, measurement of reception quality is not required.

Namely, in the first transmission among a plurality of times of transmission, the CQI value corresponding to the receiving SIR is transmitted directly to the radio base station. When it is detected that the radio environment is changed in the desirable direction, the CQI value is sequentially increased for sequential CQI transmission without SIR measurement for the sequential CQI transmission. When the radio environment is changed in the not desirable direction, on the contrary, the CQI values are reduced sequentially for sequential CQI transmission without SIR measuring for the sequential CQI transmission.

Accordingly, even when the reception quality measuring period is longer, since the CQI value is increased or decreased in accordance with the direction of change in the radio environment, the adaptive modulation control along the change in the radio environment becomes possible.

As described above, according to this embodiment, a radio communication apparatus (a mobile station) that analyzes the radio environment is provided.

In the embodiment described above, the radio environment supervising unit 14 uses, like the CQI generating unit 11, the reception quality of the CPICH or the like (reception quality in the radio processing unit before the decoding) but it is also allowed that the error information is obtained from the HS-PDSCH reception processing unit 5 in order to monitor an error rate.

For example, the CRC check unit 53 in the HS-PDSCH reception processing unit 5 receives the data via the HS-PDSCH and detects an error (CRC error check) for the decoded data and then applies the check result to the radio environment supervising unit 14.

The radio environment supervising unit 14 judges, from the given error detection result, the direction of change in the radio environment and applies the result of judgment to the CQI generating unit 11.

At the time of generating the CQI information to be transmitted to the radio base station, the CQI generating unit 11 compensates, when the error rate tends to increase, the CQI value identified using the CQI table to a small value and to the same CQI value to a large value when the error rate tends to decrease.

Of course, it is also possible to reflect change in the radio environment on generation of CQI through the processes that the CQI value read out is not compensated, the receiving SIR value used for referring to the CQI table is compensated (the SIR value is reduced when an error rate increases or the SIR value is increased when the error rate decreases), and the corresponding CQI value is read out.

[b] Description of Second Embodiment

In the second embodiment, the CQI value is compensated for on the basis of the error rate of the data via the HS-PDSCH.

As described previously, the CQI table indicates that the error quality of data received via the HS-PDSCH ideally becomes equal to the value near the desired predetermined reference value (less than the reference value).

In the actual environment, however, the CQI table does not always suggest the suitable adaptive modulation control.

Therefore, in this embodiment, the CRC check unit 53 in the HS-PDSCH 5 applies the error detection information to the error rate calculating unit 15.

The error rate calculating unit 15 calculates an error rate by calculating the number of error detection blocks/number of received data block in accordance with the error detection information and applies the calculation result to the CQI generating unit 11.

When the given error rate is compared with the constant reference error rate and this error rate is lower than the reference (i.e. the error rate decreases by a predetermined difference), the CQI generating unit 11 judges that the CQI value calculated using the CQI table is deviated to a smaller value and then executes compensation of the CQI value to a larger value.

When the given error rate is larger than the reference error rate, on the contrary (i.e. the error rate increases by a predetermined difference), the CQI generating unit 11 judges that the CQI value calculated using the CQI table is deviated to a larger value and the executes the process to compensate the CQI value to a smaller value.

Accordingly, since the transmission processing unit 13 transmits the CQI value compensated on the basis of the error rate of the data received via the HS-PDSCH, transmission via the HS-PDSCH in the excessive quality or in the insufficient quality can be controlled.

Moreover, since the CQI table itself is never updated, even after the compensation control of the CQI value under the special environment, the process may easily be returned to the CQI generation control using the CQI table.

[c] Description of Third Embodiment

In the third embodiment, the CQI value compensating process in the first embodiment is executed conforming to a certain condition.

Namely, the CQI value is measured and transmitted in the predetermined period for the radio base station. When the measurement or transmission period is longer than the predetermined reference period, the CQI value is compensated as described above. When such period is shorter, on the contrary, than the predetermined reference period, such compensation process is not carried out (i.e. the CQI value compensation process described above is not conducted and the CQI value obtained with reference to the CQI table is transmitted directly on the basis of the receiving SIR information from the demodulating unit 3).

The reason is that when the measurement and transmission period is short, the radio environment is reflected to a certain degree, but when the period is longer, reflection of the radio environment is considered insufficient.

The communication apparatus of the embodiment may provide a radio communication apparatus and a mobile station sensitive to changes in the radio environment.

Moreover, excessive transmission quality or insufficient transmission quality is controlled.

What is claimed is:

1. A radio communication apparatus transmitting a parameter used for adaptive modulation control in a transmitting apparatus conducting the adaptive modulation control, the radio communication apparatus comprising:
   a radio environment supervising unit operable to supervise change in the radio environment based on a received signal from the transmitting apparatus,
   a storage unit operable to store a correspondence relationship between reception quality of the received signal from the transmitting apparatus and a parameter used for adaptive modulation control,
   a parameter generating unit operable to select, upon detection that the radio environment is improved by the radio environment supervising unit, a parameter corresponding to a higher transmission format than that corresponding to the measured reception quality, and
   a transmitting unit operable to transmit the selected parameter.

2. A radio communication apparatus transmitting parameter used for the adaptive modulation control in a transmitting apparatus conducting the adaptive modulation control, the radio communication apparatus comprising:
   a radio environment supervising unit operable to supervise a change of radio environment based on a received signal from the transmitting apparatus,
   a storage unit operable to store correspondence relationships between a reception quality of the received signal from the transmitting apparatus and a parameter used for adaptive modulation control,
   a parameter generating unit operable to select, upon detection that the radio environment is worsened by a radio environment supervising unit, a parameter corresponding to a lower transmission format than that corresponding to the measured reception quality, and
   a transmitting unit operable to transmit the selected parameter.

3. A radio communication apparatus transmitting a parameter used for an adaptive modulation in a transmitting apparatus executing the adaptive modulation control, the radio communication apparatus comprising:
   a parameter generating unit operable to generate the parameter used for the adaptive modulation control based on a relationship between a reference error rate and a measured error rate for data transmitted through the adaptive modulation control, and
   a transmitting unit operable to transmit the generated parameter, and
   a storage unit operable to store a correspondence relationship between a reception quality of the received signal from the transmitting apparatus and the parameter used for the adaptive modulation control,
   wherein the parameter generating unit is further operable to generate the parameter corresponding to the measured reception quality through compensation thereof with the relationship as a result of a comparison between the measured error rate and the reference error rate.

* * * * *